United States Patent
White et al.

(10) Patent No.: US 9,807,207 B2
(45) Date of Patent: Oct. 31, 2017

(54) TIMING PRESERVATION FOR NETWORK COMMUNICATIONS

(71) Applicant: Adtran Inc., Huntsville, AL (US)

(72) Inventors: Troy W. White, Toney, AL (US); Walter Stuart Venters, Huntsville, AL (US)

(73) Assignee: ADTRAN, Inc., Huntsville, AL (US)

(*) Notice: Subject to any disclaimer, the term of this patent is extended or adjusted under 35 U.S.C. 154(b) by 249 days.

(21) Appl. No.: 14/669,845

(22) Filed: Mar. 26, 2015

(65) Prior Publication Data

US 2016/0285574 A1 Sep. 29, 2016

(51) Int. Cl.
*H04J 3/06* (2006.01)
*H04L 29/06* (2006.01)

(52) U.S. Cl.
CPC ............ *H04L 69/28* (2013.01); *H04J 3/0638* (2013.01); *H04J 3/0673* (2013.01); *H04L 69/18* (2013.01); *H04J 3/0647* (2013.01); *H04J 3/0661* (2013.01)

(58) Field of Classification Search
CPC ........ G11B 20/10222; G11B 20/10305; H04L 45/00; H04L 49/00; H04L 7/00; H04L 7/0054; H04W 56/005; H04W 56/001; H04W 56/0035
USPC ....... 370/350, 329, 351, 535–537, 503, 506, 370/509, 510
See application file for complete search history.

(56) References Cited

U.S. PATENT DOCUMENTS

| | | | |
|---|---|---|---|
| 5,146,477 A * | 9/1992 | Cantoni | H04J 3/07 370/506 |
| 6,229,863 B1 * | 5/2001 | Rude | H04J 3/073 370/505 |
| 7,643,595 B2 * | 1/2010 | Aweya | H03D 13/002 375/356 |
| 8,699,879 B2 * | 4/2014 | Watanabe | H04Q 11/0005 398/45 |
| 8,977,120 B2 * | 3/2015 | Ohara | H04J 3/1658 398/43 |
| 9,306,692 B2 * | 4/2016 | Rabinovich | |

* cited by examiner

*Primary Examiner* — Hanh N Nguyen
(74) *Attorney, Agent, or Firm* — Fish & Richardson P.C.

(57) ABSTRACT

Methods, systems, and apparatus for preserving timing domains of different communications types of signals in a telecommunications network are disclosed. In one aspect a network element (NE) includes a receiver configured to receive communications signals of two different communications types. The NE can include a timing analyzer configured to obtain a local reference clock (LRC), detect two different received reference clocks (RRCs) corresponding to the two different communications types, and for each received communications signal, determine a quantized value (QV) based on a difference between the LRC and the RRC. The NE can include a timing generator configured to generate, for the received communications signal, a transmit reference clock (TRC) that is referenced to, but different from, each of the LRC and the QV. The NE can include a transmitter configured to output an output signal based on the received communications signal and the TRC for the received communications signal.

19 Claims, 3 Drawing Sheets

TIMING PRESERVATION FOR NETWORK COMMUNICATIONS

BACKGROUND

This specification relates to communications in a telecommunications environment.

Timing transport in networking systems is typically limited to a single timing domain for a given network element (NE). This is largely based off the existing deployed Synchronous Digital Hierarchy (SDH) systems that have a single timing hierarchy. Modern networks are using new technologies for timing transport, e.g. Synchronous Ethernet (SyncE), IEEE 1588, etc., as well as timing agnostic transport technologies like Optical Transport Network (OTN).

SUMMARY

In general, one innovative aspect of the subject matter described in this specification can be embodied in methods that include obtaining, by a network element, a local reference clock (LRC) representing a timing domain of the network element; receiving, by the network element, communications signals of two different communications types; detecting, by the network element, two different received reference clocks (RRCs) representing two different timing domains corresponding to the two different communications types; for each received communications signal, determining a quantized value (QV) based on a difference between the LRC and the RRC of the timing domain for the communications type of the received communications signal; generating, for the received communications signal, a transmit reference clock (TRC) that is referenced to, but different from, each of the LRC and the QV; and outputting an output signal based on the received communications signal and the TRC for the received communications signal.

These and other embodiments can each optionally include one or more of the following features. Determining the QV can include determining a value representing a frequency difference or a phase difference between the LRC and the RRC.

Detecting two different RRCs can include detecting an RRC of a received optical transport network (OTN) signal; and outputting the output signal comprises outputting the output signal with an OTN transmission clock that matches the LRC.

Methods can include the actions of performing bit stuffing adjustment to the received communications signal to create an output signal that accounts for the difference between the LRC and RRC, wherein output the output signal comprises transmitting the output signal with the LRC.

Detecting two different RRCs can include detecting an RRC of a synchronous Ethernet (SyncE) signal. Determining the transmit timing signal can include determining a SyncE transmission clock based on the LRC and the difference between the LRC and the RRC of the received SyncE signal. The SyncE transmission clock and the RRC of the received SyncE signal can be in a same timing domain.

Detecting two different RRCs can include deriving an RRC of a received precision time protocol (PTP) signal based on timing information contained in one or more packets of the received PTP signal. Determining the transmit timing signal can include determining a PTP transmit timing based on the LRC and the difference between the LRC and the RRC of the received PTP signal.

Another innovative aspect of the subject matter described in this specification can be embodied in a network element that includes a receiver configured to receive communications signals of two different communications types; a timing analyzer configured to: obtain a local reference clock (LRC) representing a timing domain of a network element; detect two different received reference clocks (RRCs) representing two different timing domains corresponding to the two different communications types; and for each received communications signal, determine a quantized value (QV) based on a difference between the LRC and the RRC of the timing domain for the communications type of the received communications signal. The network element can also include a timing generator configured to generate, for the received communications signal, a transmit reference clock (TRC) that is referenced to, but different from, each of the LRC and the QV and a transmitter configured to output an output signal based on the received communications signal and the TRC for the received communications signal.

These and other embodiments can each optionally include one or more of the following features. The network element can include a switch fabric. The QV can represent a frequency difference or a phase difference between the LRC and the RRC.

The network element can be configured to: detect an RRC of a received optical transport network (OTN) signal; and output the output signal with an OTN transmission clock that matches the LRC.

The network element can be configured to perform bit stuffing adjustment to the received communications signal to create an output signal that accounts for the difference between the LRC and RRC, wherein the output signal is transmitted with the LRC.

The network element can be configured to: detect an RRC of a synchronous Ethernet (SyncE) signal; and determine a SyncE transmission clock based on the LRC and the difference between the LRC and the RRC of the received SyncE signal. The SyncE transmission clock and the RRC of the received SyncE signal can be in the same timing domain.

The network element can be configured to: derive an RRC of a received precision time protocol (PTP) signal based on timing information contained in one or more packets of the received PTP signal; and determine a PTP transmit timing based on the LRC and the difference between the LRC and the RRC of the received PTP signal.

Another innovative aspect of the subject matter described in this specification can be embodied in a system that includes a plurality of network elements; and a given network element. The given network element can include a receiver configured to receive communications signals of two different communications types from the plurality of network nodes; and a timing analyzer configured to: obtain a local reference clock (LRC) representing a timing domain of a network element; detect two different received reference clocks (RRCs) representing two different timing domains corresponding to the two different communications types; and for each received communications signal, determine a quantized value (QV) based on a difference between the LRC and the RRC of the timing domain for the communications type of the received communications signal. The given network element can include a timing generator configured to generate, for the received communications signal, a transmit reference clock (TRC) that is referenced to, but different from, each of the LRC and the QV; and a transmitter configured to output an output signal based on the received communications signal and the TRC for the received communications signal.

These and other embodiments can each optionally include one or more of the following features. The given network element can include a switch fabric. The QV can represent a frequency difference or a phase difference between the LRC and the RRC.

The given network element can be configured to: detect an RRC of a received optical transport network (OTN) signal; and output the output signal with an OTN transmission clock that matches the LRC.

The given network element can be configured to perform bit stuffing adjustment to the received communications signal to create an output signal that accounts for the difference between the LRC and RRC, wherein the output signal is transmitted with the LRC.

The given network element can be configured to: detect an RRC of a synchronous Ethernet (SyncE) signal; and determine a SyncE transmission clock based on the LRC and the difference between the LRC and the RRC of the received SyncE signal. The SyncE transmission clock and the RRC of the received SyncE signal can be in the same timing domain.

The given network element can be configured to: derive an RRC of a received precision time protocol (PTP) signal based on timing information contained in one or more packets of the received PTP signal; and determine a PTP transmit timing based on the LRC and the difference between the LRC and the RRC of the received PTP signal.

Particular embodiments of the subject matter described in this specification can be implemented so as to realize one or more of the following advantages. Unlike techniques that only handle the time domain of a single communications type (e.g., either the OTN or the Ethernet) in a single timing domains, the example techniques can be applied to a variety of network transmission technologies and satisfy timing preservation requirements of multiple different communications types that each have different timing domains. The example techniques can be efficiently implemented, without adding substantial structural complexity within the internal network element switch fabric and/or packet or cell formats. The example techniques can allow multiple timing domains with absolute time accuracy, e.g., nanosecond accurate time-of-day (TOD) clocks, to be transported across an asynchronous switch fabric. The example techniques can deliver the required quantized value (QV) timing information across a backplane of a network element. The techniques discussed throughout this document improve communications over a telecommunications network and enable a network element to facilitate communications of multiple different communications types that may utilize multiple different timing domains.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
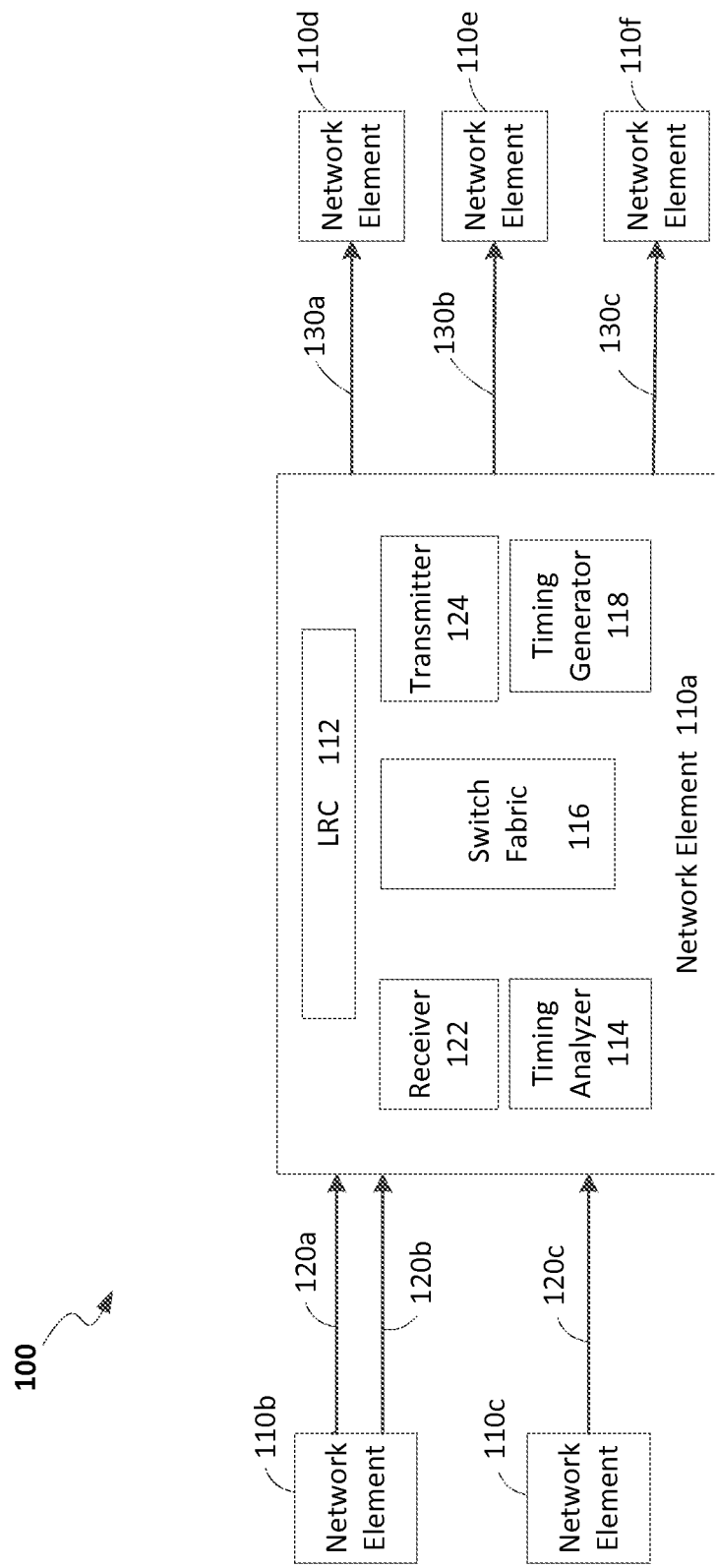
FIG. 1 is a block diagram showing aspects of an example telecommunications network.

Networking technologies such as Optical Transport Network (OTN), Synchronous Ethernet (SyncE), and IEEE 1588 Precision Time Protocol (PTP) provide various enablers for service providers. For example, OTN includes a set of Optical Network Elements (ONE) connected by optical fiber links. OTNs as specified in ITU-T G.709 and further defined in ITU-T G.8251 standards operate in an asynchronous fashion. OTNs provide a ubiquitous transport technique for many client services and can support optical networking using wavelength-division multiplexing (WDM). SyncE and IEEE 1588 enable service providers to retire existing Time-division multiplexing (TDM) networks and still provide reliable timing for new technologies like mobile backhaul, etc.

For example, SyncE defined in ITU-T G.8261 is a standard for distribution of frequency over Ethernet links and can provide physical-layer frequency distribution through an Ethernet port. The SyncE signal transmitted over the Ethernet physical layer can be traceable to an external clock, ideally a master and unique clock for the whole network. PTP establishes a master-slave hierarchy of clocks in a network. PTP protocol synchronizes slave clocks to a master clock ensuring that events and timestamps in all devices in the network use the same time base.

The signals of these technologies (e.g., OTN, Ethernet, etc.) require switching systems to forward and/or cross-connect the signals. For example, Ethernet flows or OTN Optical Data Units (ODUs) need to be correctly routed and forwarded to its destination. To adequately transport timing information within the network switching system for these different protocols, synchronous switching can be implemented but may only facilitate communications transmitted according to a specific protocol (e.g., either OTN only or Ethernet only implementations).

Example techniques are disclosed in this document to provide a solution such that timing information can be accurately reproduced or replicated for signals that flow across a generic asynchronous packet or cell-based switch fabric. In addition, transportation of the information required for accurate timing replication can be implemented numerous ways. For example, it can be transmitted in band within the format of the native switch fabric protocol cells/packets, out of band across the same fabric, or out of band on a completely different path given certain latency or delay constraints met on that path.

In some implementations, example techniques are disclosed in this document to provide timing preservation for communications signals of multiple different communications types (e.g., using different transmission technologies, timing references, and/or protocols) in a communications network. The example techniques can be implemented at a network element in the communications network. For instance, the network element can receive multiple communications signals of different communications types, apply respective timing preservation techniques to the incoming communications signals according to the communications types, and forward the communications signals to their respective destinations with appropriate timing matched to the respective incoming communications signals.

In some implementations, the example techniques can make use of local reference timing (e.g. local a local reference clock (LRC)) of the network element. For example, the network element can compare timing of an incoming communications signal with its local reference timing, and then reconstruct, create, or otherwise generate timing of a corresponding outgoing communications signal based on a difference between the timing of the incoming communications signal and the local reference timing, such that the timing of the output and input communications signals are matched (e.g., belonging to the same timing domain and/or having the same transmit timing clock as the received timing clock of the incoming communications signal, etc.).

The example techniques described herein can be implemented as methods, computer program products, apparatus, devices, etc., for example, to provide synchronization of devices of a telecommunications network, thereby improving communications over a telecommunications network (e.g., by enabling multiple different types of communications to be routed through a same network node). The example techniques improve the timing management and control capabilities of the network elements.

The discussion that follows with reference to FIG. 1 introduces components of an example telecommunications network that can perform the example techniques for timing preservations for network communications. The description referencing FIG. 2 relates to example timing preservation techniques that can be implemented at a network element (e.g., of the example network of FIG. 1) to provide appropriate transmit timing of multiple outgoing communications signals of different communications types. The description referencing FIG. 3 provides details regarding an example method for preserving respective timing domains of communications signals with different communications types within a telecommunications network. The example method can provide an effective solution for handling synchronization of communications signals with different communications types.

FIG. 1 is a block diagram showing aspects of an example telecommunications network 100. The example network 100 can be, for example, a core network, a backhaul network, an access network, or another type of telecommunications network. As an example, the network 100 can include a mobile backhaul network that connects wireless base stations to the corresponding base station controllers. The example network 100 can support various networking technologies such as, for example, ONT, Ethernet, plesiochronous digital hierarchy (PDH) and Synchronous Optical Networking (SONET) and Synchronous Digital Hierarchy (SDH) (e.g., E1/T1, E3, T3, STM-1/OC-3, etc.), xDSL (e.g., ADSL, SHDSL, VDSL2, etc.) that provides network services using optical fiber, wiring, frequency spectrum or a combination of these and other media.

The example network 100 includes a number of network elements 110a-f (collectively referred to as 110). The network elements 110 can include any network device in a telecommunications network. For example, the network elements 110 can be network distribution elements at a central office (e.g., a digital subscriber line access multiplexer (DSLAM), a router, etc.), a remote node, a multiplexer, a splitter, customer-premises equipment (CPE), a subscriber device (e.g., CPE modems) at customer sites, a base station, a relay station or any other network devices. In some implementations, a telecommunications network can include additional or different components and features and can be configured in a different manner (e.g., in bus, ring, or other topologies) than the example network 100 shown in FIG. 1.

In the example shown in FIG. 1, network element 110a is coupled to network elements 110b-f. In general, the network element 110a can receive incoming communications signals from one or more of the network elements 110b-f, and output outgoing communications signals to one or more other network elements among the network elements 110b-f. The network element 110a can include a receiver 122, a switch fabric 116, and a transmitter 124. The receiver 122 and the transmitter 124 can be on the same or different line card. In the illustrated example, the receiver 122 can receive incoming communications signals 120a and 120b from the network element 110b, and an incoming communications signal 120c from network element 110c. The switch fabric 116 can switch the multiple incoming communications signals according to their respective destinations. For instance, the incoming communications signals 120a, 120b, and 120c can be mapped to communications signals 130a, 130b, and 130c, respectively. The transmitter 124 can output the communications signals 130a, 130b, and 130c to the network elements 110d, 110e, and 110f, respectively.

The multiple incoming communications signals 120a, 120b, and 120c can be the same or different communications types and can have the same or different timing domains. For instance, the incoming communications signal 120a, 120b, or 120c can include one or more of an OTN signal, an Ethernet signal, or another type of communications signal. In some instances, the Ethernet signal can be a SyncE signal that is transmitted over one or more synchronous Ethernet links, or an asynchronous Ethernet (AsyncE) signal that is transmitted over one or more asynchronous links. To ensure correct timing transport, the network element 110a generates appropriate timing domains of the outgoing communications signals so that they are matched to their corresponding input communications signals. In some implementations, the network element 110a can rely on a single timing reference (e.g., a local reference clock (LRC)) and output the communications signals with timing references that are based on the single LRC.

For instance, the network element 110a can include a local reference timing source (e.g., an LRC 112), a timing analyzer 114, and a time generator 118. The timing analyzer 114 can analyze timing information of the received incoming communications signals. For instance, timing analyzer 114 can derive timing of the received incoming communications signals, compare the timing of the received incoming communications signals with the LRC, and determine differences between the received incoming communications signals and the LRC (e.g., for later timing reconstruction). The time generator 118 can generate a transmit timing signal for outgoing or output communications signals, for example, based on the LRC 112 and the differences of the received incoming communications signals and the LRC. The switch fabric 116 can switch and route the multiple received communications signals 120a-c towards the appropriate destinations. Example functionalities and operations of the network element 110 and its components are described in greater detail with reference to FIG. 2.

Figure 2:
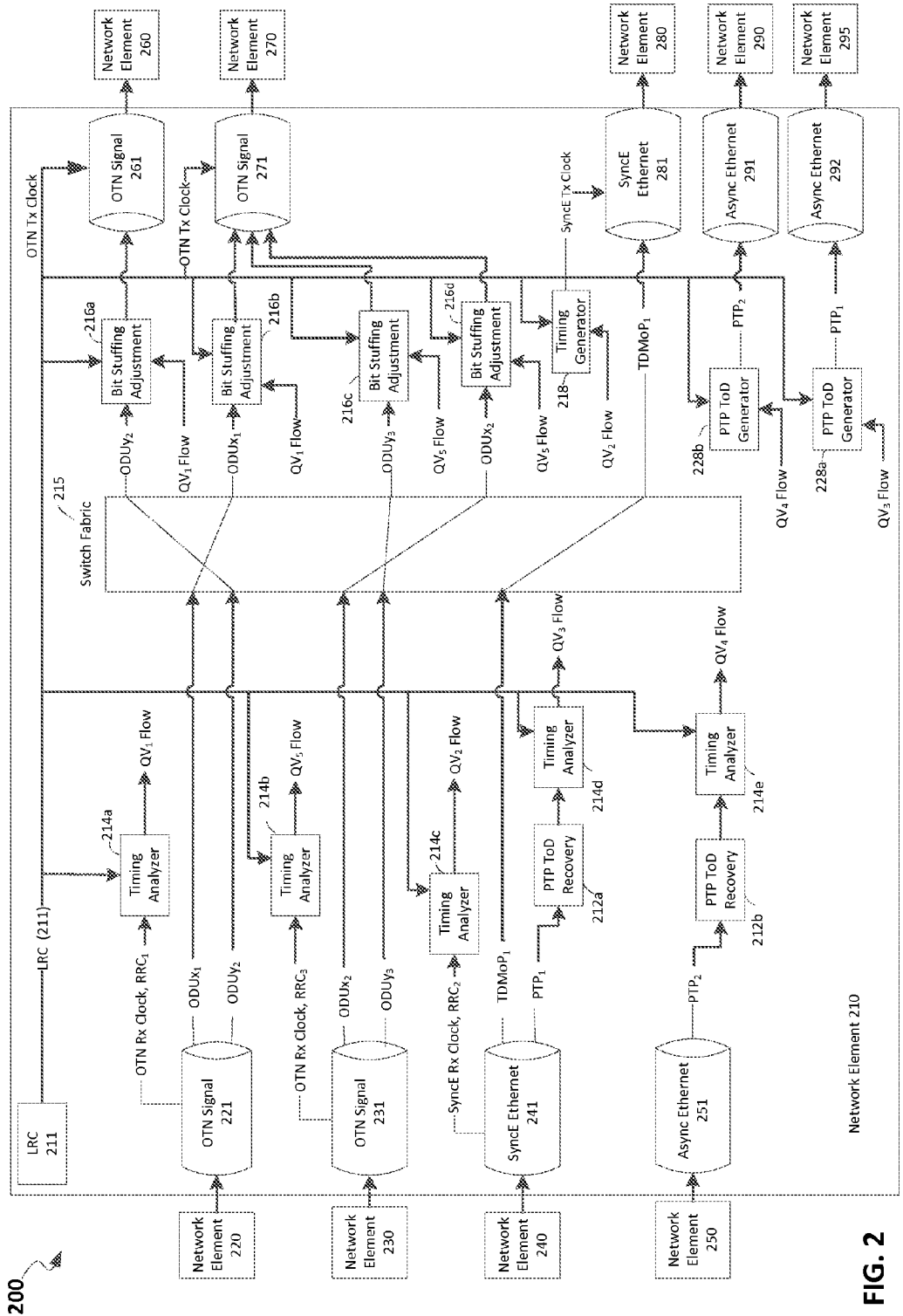
FIG. 2 is a block diagram showing aspects of example time preservation processes of a telecommunications network.
Figure 3:
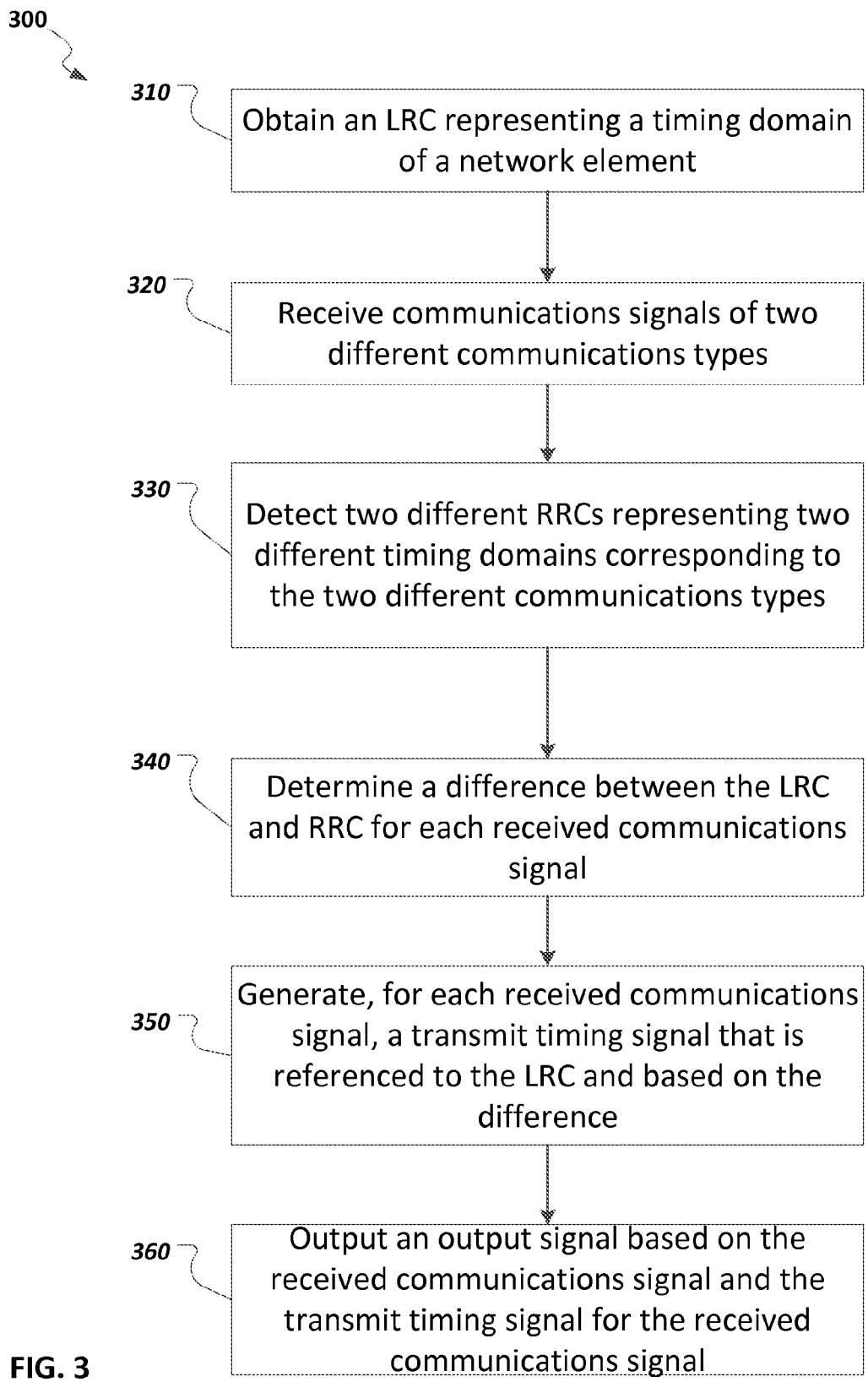
FIG. 3 is a flow chart of an example process for preserving timing domains of communications signals of different communications types within a telecommunications network.

FIG. 2 is a block diagram illustrating example time preservation techniques that can be performed by a network element 210 of a telecommunications network 200. The telecommunications network 200 can be the example network 100 of FIG. 1 or another communication network. The illustrated telecommunications network 200 includes ten network elements 210, 220, 230, 240, 250, 260, 270, 280, 290, and 295. Each of the network elements 210-295 can be one of the network elements 110a-f of FIG. 1, or another network element. The telecommunications network 200 can include additional or different network elements and may be configured in a different manner as shown in FIG. 2.

In the illustrated example in FIG. 2, the network element 210 is coupled to the other nine network elements 220-295. The network element 210 receives communications signals (e.g., OTN signals 221 and 231, SyncE signal 241, and AsyncE signal 251) from the network elements 220, 230, 240, and 250, and output communications signals (e.g., OTN signals 261 and 271, SyncE signal 281, and AsyncE signals 291 and 292) to network elements 260, 270, 280, 290, and 295. The network element 210 can receive and transmit other types of communications signals.

As illustrated, the network element 210 includes a common system timing source reference (i.e., an LRC 211), a switch fabric 215, PTP Time of Day (ToD) recovery modules 212a and 212b, timing analyzers 214a-e, timing generator 218, bit stuffing adjustment modules 216a-d, and PTP ToD generators 228a and 228b. The timing analyzers 214a-e and timing generator 218 can be similar to the timing analyzer 114 and timing generator 118 of FIG. 1, or they can be different. In some implementations, the multiple instances of the illustrated modules (e.g., the timing analyzers 214a-e, the bit stuffing adjustment modules 216a-d, and PTP ToD generators 228a and 228b) can be implemented as separated software, firmware, and/or hardware modules with or without variations for different types of communications signals, or they can be implemented as a single module that can be shared and reused.

In some implementations, the network element 210 can identify multiple timing references (e.g., Received Reference Clocks (RRCs)) of the various received communications signals. The RRCs of the received signals (e.g., the OTN and/or Ethernet signals) need to be subsequently relayed or locked to signals transmitted from the same network element 210 with respective Transmitted Reference Clocks (TRC).

In some implementations, a timing analyzer (e.g., timing analyzers 214a-e) can be used to determine the frequency/phase difference between a given RRC and the LRC in a quantized fashion and result in quantized values (QVs such as $QV_1$-$QV_4$). These QVs can represent phase/frequency information that can be transmitted to one or more transmit timing modules or transmitters (e.g., on one or more line cards) to relay the timing information of a given RRC to all transmitters requiring a TRC. The transmit timing modules receiving the QVs can use the contained information to reconstruct the timing information for transmission in the native format. For example, for OTN signals, the QV information can be used to modify the stuff bits to account for differences between the LRC and RRC. For SyncE, the QV information can be used to control the Ethernet transmit clock frequency. For PTP timing sources, the QV information can be used to replicate the PTP timing sources without the need to account for packet forwarding delays within the network element.

As illustrated, the network element 210 receives OTN signals 221 and 231 from the network elements 220 and 230, respectively. The OTN signals can include the server layer signal for client signals. In some implementations, an OTN signal can include one or more multiplexed optical data units (ODUs). For example, the OTN signal 221 includes two ODUs, $ODUx_1$ and $ODUy_2$ while the OTN signal 231 includes two ODUs, $ODUx_2$ and $ODUy_3$. Each ODU can have a respective destination. The switch fabric 215 of the network element 210 can switch the multiple ODUs according to their respective destinations. In the illustrated example in FIG. 2, the $ODUx_1$ is forwarded toward the network element 270 whereas the ODUs, $ODUy_2$, $ODUx_2$ and $ODUy_3$ are forwarded toward the network element 260.

In some instances, the RRC of the $ODUx_1$ and $ODUy_2$ from network element 220 can be different than the RRC of both $ODUx_2$ and $ODUy_3$ from network element 230. To output the multiple ODUs from the network element 1, the multiple ODUs may need to have a common transmit timing that is matched to the local timing domain of the network element 1. For example, the output OTN signals 261 towards the network element 260 and the output OTN signal 271 towards the network element 270 can share the same TRC (e.g., LRC 211 of the network element 1).

In some implementations, to achieve the common transmit timing of the output OTN signals, the received client signal (e.g., the received OTN signals 221 and 231) using the received OTN's timing domain can be demapped and switched using the client's native format to preserve the client timing. Then the client signal can be remapped into an OTN using the second timing domain (e.g., the timing domain of the network element 1). This solution may require completely demapping and remapping the client signal in addition switching the client signal in its native mode to preserve the client timing across a switching device.

In other implementations, since OTN is asynchronous in nature and relies on bit stuffing techniques to transport synchronous client signals across the asynchronous OTN network, the stuff bits can be modified before transmission of the output OTN signal in the second timing domain. These modifications would be based on timing differences between the received timing domain and the second timing domain. This approach does not require demapping and remapping the client signals or switching the client signal in the client's native mode.

For instance, upon receiving the incoming OTN signal 221, an $RRC_1$ of the received OTN signal 221 can be identified, for example, to be the carrier clock (e.g., timing, frequency, etc.) of the OTN signal 221. The frequency/phase difference between the $RRC_1$ and the LRC 211 can be derived and quantized, for example, by the timing analyzer 214a, resulting in a quantized value $QV_1$. The $QV_1$ can apply to both $ODUx_1$ and $ODUy_2$ and be used by the transmitter for transmission of the output OTN signals 261 and 271. For example, the $QV_1$ can be input into the bit stuffing adjustment modules 216a and 216b to determine the amount of bit stuffing adjustment (e.g., the number of stuff bits) for the effective transmit timing of the $ODUy_2$ and $ODUx_1$, respectively. The TRCs of the output OTN signals 261 and 271 can be both the LRC 211 of the network element 1.

Similarly, for the received OTN signal 231 from the network element 230, an $RRC_3$ of the received OTN signal 231 can be identified, for example, to be the carrier clock (e.g., timing, frequency, etc.) of the OTN signal 231. The timing analyzer 214b can determine a quantized value $QV_5$ to represent the frequency/phase difference between the $RRC_3$ and the LRC 211. The $QV_5$ can apply to both $ODUx_2$ and $ODUy_3$ and can be input into the bit stuffing adjustment modules 216d and 216c, respectively, to account for the timing difference between the $RRC_3$ and the LRC 211. The output OTN signal 271 includes the $ODUx_1$ from the received OTN signal 211 and $ODUx_2$ and $ODUy_3$ from the received OTN signal 221. The output OTN signal 271 can be transmitted using the LRC 211 as the TRC while the respective ODUs included in the output OTN signal 271 can have the same or different bit stuffing adjustments to account for the timing differences between their respective source timing domains (e.g., $RRC_1$ and $RRC_3$) and the LRC 211.

In some instances, the network element 210 can receive a SyncE signal 241 from the network element 240. The SyncE signal 241 can be transmitted over synchronous Ethernet links. In some instances, the SyncE signals can include one or more of a pseudo-wire signal (e.g., a TDM over Packet (TDMoP) signal), a PTP signals, or another type of communications signal that uses SyncE standard for timing transport. Pseudo-wire is a mechanism that emulates the attributes of a service over a packet switched network (PSN) and tunnel traffic through a PSN (e.g., Ethernet, IP or MPLS). In the case of TDM, a pseudo-wire can emulate the attributes of a TDM service such as an E1, T1, E3, T3, etc., and transmit a TDM service over Ethernet. In the illustrated example of FIG. 2, the SyncE signal 241 includes a $TDMoP_1$ signal and a $PTP_1$ signal. The $TDMoP_1$ signal is switched by the switch fabric 215 and then included an output SyncE signal 281 destined to the network element 280, while the $PTP_1$ signal is switched and included in an output AsyncE signal 292 destined to the network element 295.

Upon receiving the SyncE signal 241, a timing domain of the received OTN signal 241 (e.g., $RRC_2$) can be identified, for example, based on frequency of the received SyncE signal 241. The $RRC_2$ can be input into the timing analyzer 214c to determine a quantized value $QV_2$, for example, based on the frequency/phase difference between the $RRC_2$ and the LRC 211. The $QV_2$ can then be transmitted and input to the timing generator 218 at the transmitter side to recover of the timing of the SyncE signal. For instance, the timing generator 218 can receive the $QV_2$ and the LRC 211 and generate a transmit timing signal (e.g., the TRC of the output SyncE signal 281) that is matched to the timing domain of the received SyncE signal 241 (e.g., $RRC_2$). As an example, the generated transmit timing signal can control the frequency of the output SyncE signal 281 such that the frequency of the output SyncE signal 281 is the same as the frequency of the received SyncE signal 241. As such, the network elements 240 and 280 are in the same timing domain and the timing domain is reproduced for the network element 280 based on the received timing information of the network element 240 (e.g., included in the $QV_2$) and the timing system of the network element 210 (e.g., the LRC 211).

PTP is a packet-based solution for timing transport, with the actual clock values included inside the payloads of special packets dedicated to that task. For example, PTP protocol can include different message types (e.g., Sync messages, Delay_Req messages, Follow_Up messages and Delay_Resp messages) for time stamping and delivery. In some implementations, PTP can include a packet handshake protocol to precisely adjust Time of Day (ToD) per node. For instance, the timing information (e.g., ToD time stamps) can be distributed in frames of a PTP signal. By sending out the time-stamped frames, delay and offset among the master clock time and slave clock time can be determined. In some implementations, the timing domain of a received PTP signal can be determined, for example, by a PTP ToD recovery module (e.g., the PTP ToD recovery module 212a or 212b) based on the time-stamped frames (or packets) of the received PTP signal, while transmit timing for an output PTP signal can be constructed, for example, by a PTP ToD generator (e.g., the PTP ToD generator 228a or 228b) to embed timing information (e.g., ToD time stamps) into the payload of the output PTP signal. The transmit timing of the output PTP signal can be constructed such that the timestamps at network elements 210, 240, 250, 290, and 295 use the same time base (e.g., by synchronizing the slave clocks to a master clock). In some implementations, in addition to frequency synchronization, the PTP signal can achieve ToD synchronization (an accurate value of the current absolute time).

In some instances, PTP can be used together with SyncE to ensure high quality transport of timing information across the network. For example, the $PTP_1$ signal received from SyncE link coupled to the network element 240 can be input into the PTP ToD recovery module 212a to derive the received timing of the $PTP_1$ signal. The determined received timing of the $PTP_1$ signal can be compared with the LRC 211 by the timing analyzer 214d, resulting in a quantized value $QV_3$ that represents differences between the determined received timing of the $PTP_1$ signal and the LRC 211 of the network element 210.

On the transmitter side, the PTP ToD generator 228a can take into account the $QV_3$ and the LRC 211 to regenerate the transmit timing and include the timing information (e.g., as ToD time stamps) into the frames or packets of the output $PTP_1$ signal. The output $PTP_1$ signal can be transmitted, for example, via an AsyncE link 292, to the network element 295.

A similar process can be applied to the $PTP_2$ signal received from AsyncE signal 251 coupled to the network element 250, the $PTP_2$ signal can go through a similar cascaded timing recovery process via the PTP ToD recovery module 212b and the timing analyzer 214e to derive a quantized value $QV_4$ that represents the difference between the determined received timing of the $PTP_2$ signal and the LRC 211 of the network element 210. On the transmitter side, the PTP ToD generator 228b can determine the transmit timing of output $PTP_2$ signal based on the $QV_4$ and LRC 211, and embed the timing information into the payload of the output $PTP_2$ signal. The output $PTP_2$ signal can be transmitted, for example, via an AsyncE link 291, to the network element 290.

FIG. 3 is a flow chart of an example process 300 for preserving respective timing domains of communications signals of different communications types within a telecommunications network. The process 300 can be implemented, for example, as computer instructions stored on computer-readable media and executable by data processing apparatus, such as one or more processors of a network element within a telecommunications network discussed above with respect to FIGS. 1 and 2. For example, the process 300 can be implemented by one or more of the network element 110 and 210, or other devices in FIGS. 1 and 2.

The example process 300, individual operations of the process 300, or groups of operations may be iterated or performed simultaneously (e.g., using multiple threads). In some cases, the example process 300 may include the same, additional, fewer, or different operations performed in the same or a different order.

A local reference clock (LRC) representing a timing domain of a network element is obtained (310). For example, the LRC 211 of the example network element 210 in FIG. 2 can be detected or otherwise obtained (e.g., measured or captured). The LRC can be a frequency, a phase reference, or both that is locked to a ToD source that may be independent of other frequency/phase/ToD domains within the network element. The LRC can be a system clock of the network element (e.g., based on an oscillator) or based on another timing reference source.

Communications signals of two different communications types are received (320). The communications signal of different communication types can include, for example, one or more of an optical transport network (OTN) signal (e.g., the OTN signal 221 or 231 in FIG. 2), a synchronous Ethernet (SyncE) signal (e.g., the SyncE signal 241) that uses SyncE standard for timing transport, a precision time protocol (PTP) signal (e.g., the $PTP_1$ or $PTP_2$ signal) that uses PTP protocol for timing transport, or other types of communications signals. In some implementations, the SyncE signal can include, for example, one or more of a pseudo-wire signal (e.g., a TDMoP signal), a PTP signal, or other type of signals that are transmitted over synchronous Ethernet links. In some instances, the PTP signal can be transmitted over asynchronous Ethernet link and are sometimes referred to as an AsyncE signal.

Two different received reference clocks (RRCs) representing two different timing domains corresponding to the two different communications types are detected (330). The RRCs can be detected, for example, based on the example techniques described with respect to FIG. 2 or in another manner. For instance, an RRC of a received OTN signal can be determined as the carrier clock (e.g., timing, frequency, etc.) of the OTN signal. An RRC of a SyncE signal can be determined as the synchronous Ethernet carrier timing, for example, based on the frequency of the incoming bit stream of the SyncE signal. As an example, the RRC of a TDMoP signal that contains T1/E1 packets can be determined to be the T1/E1 carrier clock. An RRC of a received PTP signal can be derived based on timing information contained in one or more packets of the received PTP signal, for example, based on ToD time stamps included the PTP signal frames.

For each received communications signal, a difference between the LRC and the RRC of the timing domain for the communications type of the received communications signal is determined (340). In some implementations, determining the difference includes determining a quantized value (e.g., the $QV_1$-$QV_5$ in FIG. 2) representing a frequency difference and/or a phase difference between the LRC and the RRC. The difference can be quantized, for example, based on desired time accuracy (e.g., nanosecond accurate time-of-day (TOD) clocks or another level of accuracy).

In some implementations, the difference (e.g., the quantized value) can be transmitted or otherwise made available to a transmitter of the network element for transmitting the corresponding output signals. For instance, the network element can include one or more line cards. A communications signal can be received by a receiver associated with one line card, switched by a switch fabric to another line card for forwarding the communications signal to a destination. As such, the quantized value can be transmitted from one line card to another line card, for example, in band within the format of the native switch fabric protocol cells/packets, out of band across the same fabric, or out of band on a completely different path given certain latency or delay constraints met on that path. In some implementations, the quantized value can be stored in a data storage device (e.g., a memory) of the network element, and be subsequently retrieved by the transmitter on the same or different line card for use. Additional or different implementations can be applied.

For the received communications signal, a transmit timing signal is generated (350). The transmit timing signal is referenced to the LRC and based on the difference between the LRC and the RRC for the communications type of the received communications signal. The transmit timing signal can be generated, for example, based on the example processes as described with respect to FIG. 2 or in another manner.

For instance, for a received OTN signal (e.g., the OTN signal 221 or 231 in FIG. 2), the transmit timing signal can be matched to the LRC of network element. Matched transmit timing can mean that the two or more timing are exactly the same or have frequencies/phases that are within a specified amount of each other (e.g., within a tolerance threshold). In some implementations, the LRC of the network element (e.g., the LRC 211 of the network element 210) can be used as the transmit timing signal (e.g., TRC) of the output OTN signal.

In some instances, generating the transmit timing signal includes determining a SyncE transmission clock (e.g., a TRC) based on the LRC and the difference (e.g., the $QV_5$ of FIG. 2) between the LRC and the RRC of the received SyncE signal, for example, such that the SyncE transmission clock and the RRC of the received SyncE signal are in the same timing domain. For instance, in FIG. 2, the transmission clock of the output SyncE signal 281 and the RRC of the received SyncE signal 241 are in the same timing domain.

In some instances, generating the transmit timing signal includes determining a PTP transmit timing based on the LRC and the difference between the LRC and the RRC of the received PTP signal. In some implementations, the PTP transmit timing can be determined, for example, by a PTP ToD generator (e.g., the PTP ToD generator 228a or 228b), such that the transmit timing of the output PTP signal and the received timing of the received PTP signal are based on the same timing reference (e.g., a centralized primary reference clock (PRC) or a master clock).

An output signal is output (e.g., transmitted) based on the received communications signal and the transmit timing signal for the received communications signal (360). For instance, if the received communications signal is an OTN signal, the output signal can include an output signal with an OTN transmission clock that matches the LRC (e.g., using the LRC of the network element as the TRC of the output OTN signal). In addition, in some instances, bit stuffing adjustment to the received communications signal can be performed to create the output signal that accounts for the difference between the LRC and RRC. For instance, the output OTN signal can include one or more ODUs with respective bit stuffing adjustments, while the output OTN signal can be transmitted using the LRC as the transmission clock.

If the received communications signal is a SyncE signal, the output signal can include the received SynE signal and be transmitted using the determined SyncE transmission clock based on the LRC and the difference between the LRC and the RRC of the received SyncE signal.

If the received communications signal is a PTP signal, the output signal can include the received PTP signal and insert determined transmit timing (e.g., in the form of ToD time stamps or another format) in the frames of the output PTP signal. The determined PTP transmit timing can be based on the LRC and the difference between the LRC and the RRC of the received PTP signal.

The disclosed methods of using a common LRC and common QV to transport timing for different communications formats also permits the translation of timing from one input format to a different output format.

Additionally, using a common LRC and common QV as discussed in this document permits QV measurements from different inputs to be combined to make a more robust QV value for output. This permits the implementation of classic telco timing system features like source selection and holdover in an environment with multiple paths to independent timing sources.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The operations described in this specification can be implemented as operations performed by a data processing device on data stored on one or more computer-readable storage devices or received from other sources.

The term "data processing device" encompasses all kinds of apparatus, devices, and machines for processing data, including by way of example a programmable processor, a computer, a system on a chip, or multiple ones, or combinations, of the foregoing, as well as telecommunications equipment that may include one or more data processing devices. The data processing device can include special purpose logic circuitry, e.g., an FPGA (field programmable gate array) or an ASIC (application specific integrated circuit). The data processing device can also include, in addition to hardware, code that creates an execution environment a computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   obtaining, by a network element, a local reference clock (LRC) representing a timing domain of the network element;
   receiving, by the network element, communications signals of two different communications types;
   detecting, by the network element, two different received reference clocks (RRCs) representing two different timing domains corresponding to the communications signals of the two different communications types;
   for each received communications signal,
      determining a corresponding quantized value (QV) based on a frequency difference or a phase difference between the LRC and the RRC of the timing domain for the communications type of the particular received communications signal;
      generating, for the particular received communications signal, a transmit reference clock (TRC) that is different from the LRC, wherein the TRC is generated based on the LRC and the corresponding QV; and
      outputting an output signal based on the particular received communications signal and the corresponding TRC.

2. The method of claim 1, wherein:
   detecting two different RRCs comprises detecting an RRC of a received optical transport network (OTN) signal; and
   outputting the output signal comprises outputting the output signal with an OTN transmission clock that matches the LRC.

3. The method of claim 2, further comprising performing bit stuffing adjustment to the received communications signal to create an output signal that accounts for the difference between the LRC and RRC, wherein output the output signal comprises transmitting the output signal with the LRC.

4. The method of claim 1, wherein:
   detecting two different RRCs comprises detecting an RRC of a synchronous Ethernet (SyncE) signal; and
   generating the TRC comprises determining a SyncE transmission clock based on the LRC and the difference between the LRC and the RRC of the received SyncE signal.

5. The method of claim 4, wherein the SyncE transmission clock and the RRC of the received SyncE signal are in a same timing domain.

6. The method of claim 1, wherein:
   detecting two different RRCs comprises deriving an RRC of a received precision time protocol (PTP) signal based on timing information contained in one or more packets of the received PTP signal; and
   generating the TRC comprises determining a PTP transmit timing based on the LRC and the difference between the LRC and the RRC of the received PTP signal.

7. A network element, comprising:
   a receiver configured to receive communications signals of two different communications types;
   a timing analyzer configured to:
      obtain a local reference clock (LRC) representing a timing domain of a network element;
      detect two different received reference clocks (RRCs) representing two different timing domains corresponding to the communications signals of the two different communications types; and
      for each received communications signal,
         determine a corresponding quantized value (QV) based on a frequency difference or a phase difference between the LRC and the RRC of the timing domain for the communications type of the particular received communications signal;

a timing generator configured to generate, for the particular received communications signal, a transmit reference clock (TRC) that is different from the LRC, wherein the TRC is generated based on the LRC and the corresponding QV; and a transmitter configured to output an output signal based on the particular received communications signal and the corresponding TRC.

8. The network element of claim 7, wherein the network element is configured to:

detect an RRC of a received optical transport network (OTN) signal; and output the output signal with an OTN transmission clock that matches the LRC.

9. The network element of claim 8, wherein the network element is further configured to perform bit stuffing adjustment to the received communications signal to create an output signal that accounts for the difference between the LRC and RRC, wherein the output signal is transmitted with the LRC.

10. The network element of claim 7, wherein the network element is configured to:

detect an RRC of a synchronous Ethernet (SyncE) signal; and determine a SyncE transmission clock based on the LRC and the difference between the LRC and the RRC of the received SyncE signal.

11. The network element of claim 10, wherein the SyncE transmission clock and the RRC of the received SyncE signal are in the same timing domain.

12. The network element of claim 7, wherein the network element is configured to:

derive an RRC of a received precision time protocol (PTP) signal based on timing information contained in one or more packets of the received PTP signal; and determine a PTP transmit timing based on the LRC and the difference between the LRC and the RRC of the received PTP signal.

13. A system, comprising:

a plurality of network elements; and a given network element comprising:

a receiver configured to receive communications signals of two different communications types from the plurality of network nodes;

a timing analyzer configured to:

obtain a local reference clock (LRC) representing a timing domain of a network element;

detect two different received reference clocks (RRCs) representing two different timing domains corresponding to the communications signals of the two different communications types; and for each received communications signal, determine a corresponding quantized value (QV) based on a frequency difference or a phase difference between the LRC and the RRC of the timing domain for the communications type of the particular received communications signal;

a timing generator configured to generate, for the particular received communications signal, a transmit reference clock (TRC) that is different from the LRC, wherein the TRC is generated based on the LRC and the corresponding QV; and a transmitter configured to output an output signal based on the particular received communications signal and the TRC for the received communications signal.

14. The system of claim 13, wherein the given network element is configured to:

detect an RRC of a received optical transport network (OTN) signal; and output the output signal with an OTN transmission clock that matches the LRC.

15. The system of claim 14, wherein the given network element is further configured to perform bit stuffing adjustment to the received communications signal to create an output signal that accounts for the difference between the LRC and RRC, wherein the output signal is transmitted with the LRC.

16. The system of claim 13, wherein the given network element is configured to:

detect an RRC of a synchronous Ethernet (SyncE) signal; and determine a SyncE transmission clock based on the LRC and the difference between the LRC and the RRC of the received SyncE signal.

17. The system of claim 16, wherein the SyncE transmission clock and the RRC of the received SyncE signal are in the same timing domain.

18. The system of claim 13, wherein the given network element is configured to:

derive an RRC of a received precision time protocol (PTP) signal based on timing information contained in one or more packets of the received PTP signal; and determine a PTP transmit timing based on the LRC and the difference between the LRC and the RRC of the received PTP signal.

19. The system of claim 13, wherein the given network element is further configured to translate timing from one input format to a different output format based on the corresponding QV and the LRC.

\* \* \* \* \*